No. 804,252. PATENTED NOV. 14, 1905.
E. T. MORRIS.
GATE OPENER.
APPLICATION FILED MAY 5, 1905.
3 SHEETS—SHEET 1.
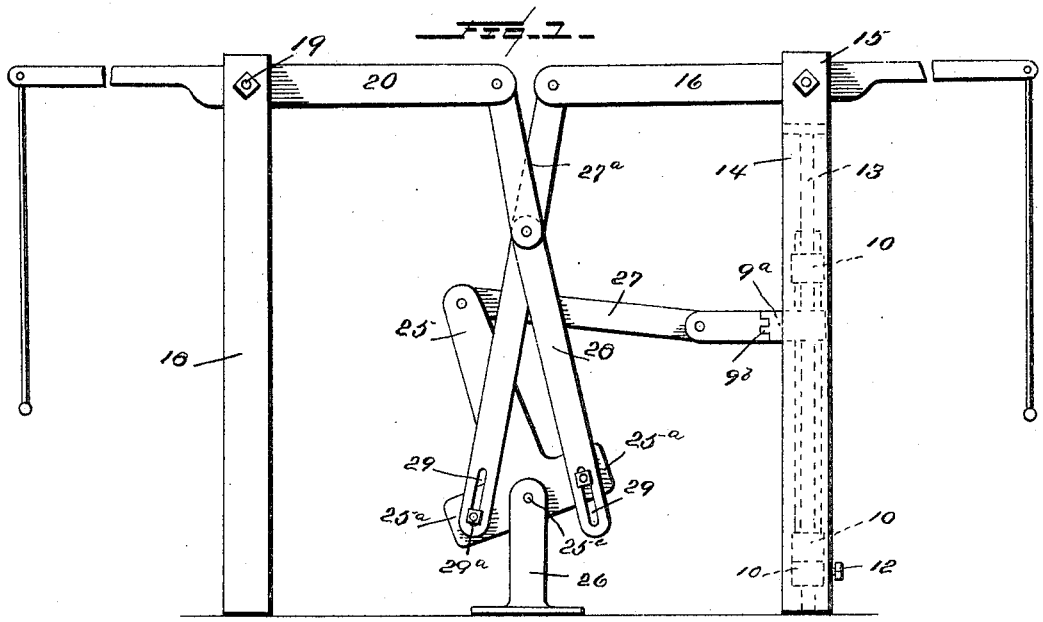
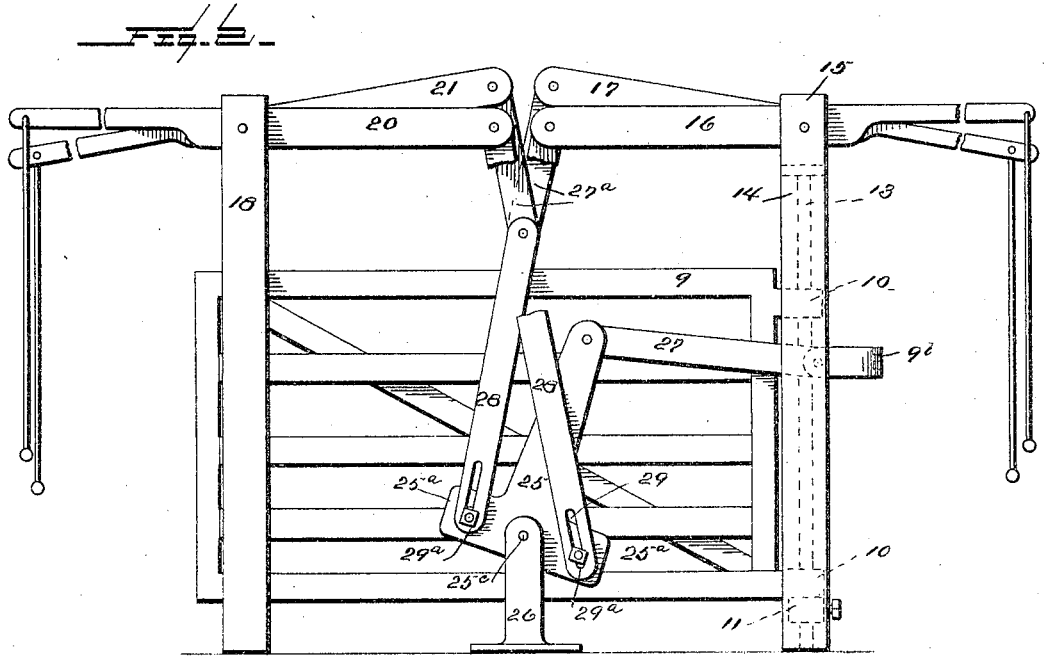
WITNESSES
INVENTOR
Edgar T. Morris,
BY Milo B. Stevens & Co.
Attorneys.

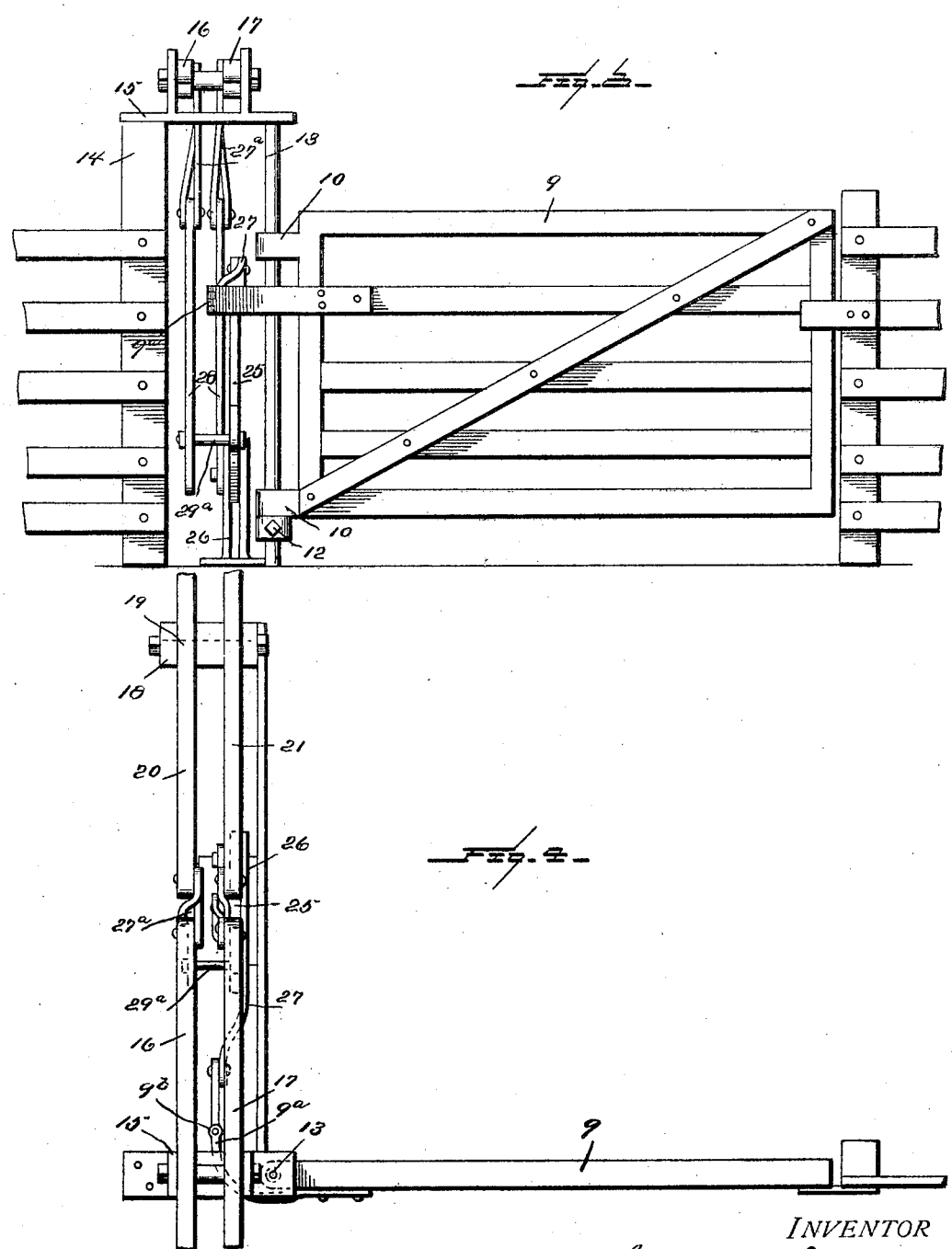

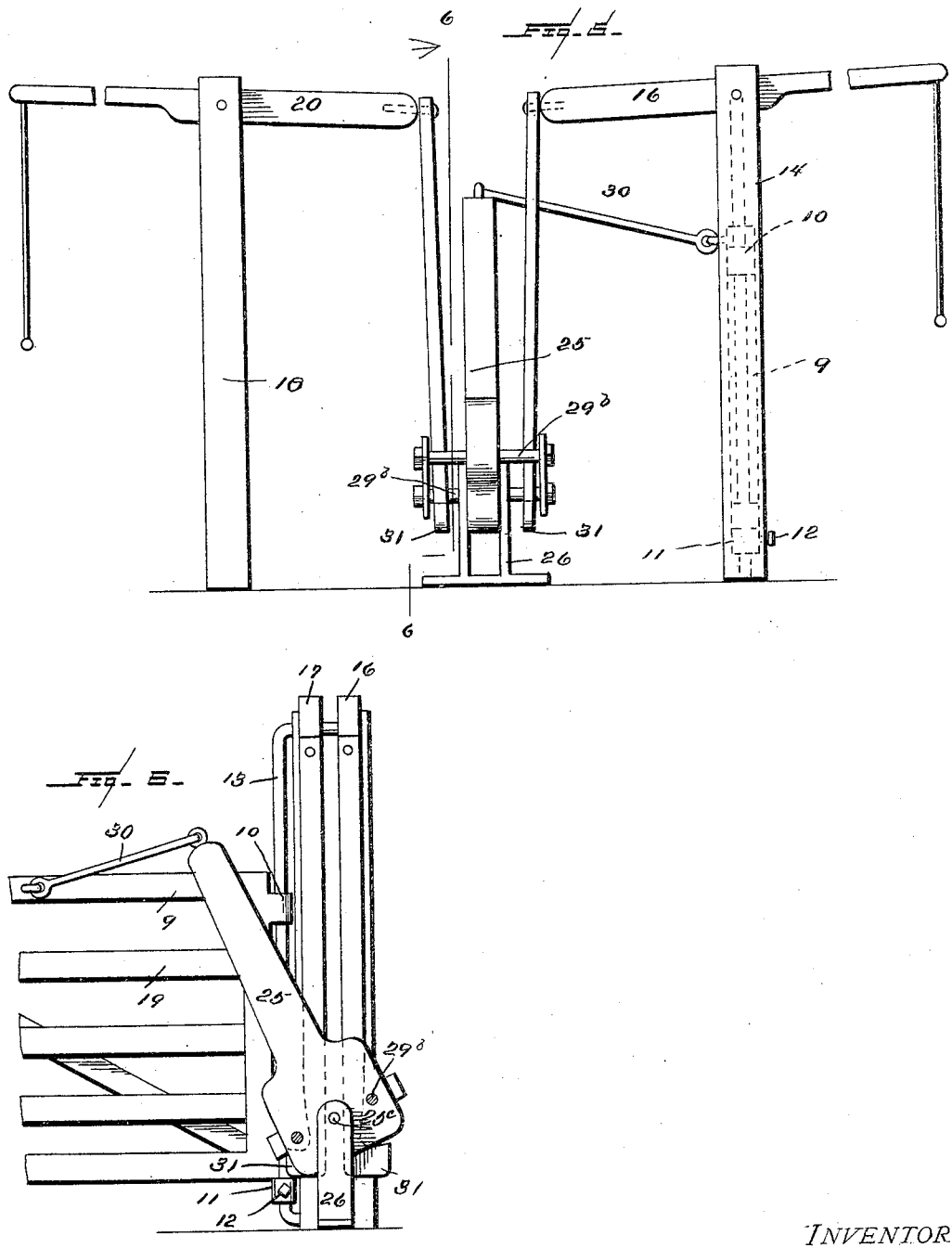

UNITED STATES PATENT OFFICE.

EDGAR T. MORRIS, OF ELBURN, ILLINOIS.

GATE-OPENER.

No. 804,252. Specification of Letters Patent. Patented Nov. 14, 1905.

Application filed May 5, 1905. Serial No. 259,070.

*To all whom it may concern:*

Be it known that I, EDGAR T. MORRIS, a citizen of the United States, residing at Elburn, in the county of Kane and State of Illinois, have invented new and useful Improvements in Gate-Openers, of which the following is a specification.

This invention is a device for opening or closing swinging gates or similar structures; and it consists of simple and novel means whereby the gate can be readily opened or shut, especially by a person in a carriage or on horseback.

In the accompanying drawings, Figure 1 is a side elevation of the device, the gate being closed and at right angles to the same. Fig. 2 is a similar elevation showing the gate open. Fig. 3 is an elevation looking toward the gate with the same closed. Fig. 4 is a top view of the same. Fig. 5 is an elevation showing a modification, the gate being in a closed position. Fig. 6 is a section of the same, taken on the line 6 6 of Fig. 5.

In the drawings, 9 indicates a swinging gate having hinges or pivot-blocks 10. To support the gate, I preferably use an adjusting-collar 11 and set-screw 12, on which the lower hinge rests and whereby the gate may be adjusted vertically on the pipe or rod 13, which forms the gate-post.

14 is a post located behind or at the side of the gate-post and having a top bracket 15, which serves as a bearing for the pivots of the operating-levers 16 and 17 and also as a top support for the rod 13.

18 is a post at right angles to the gate. Operating-levers 20 and 21 are pivoted at 19 to the top of this post.

In Figs. 1 to 6 I show double levers 15 and 16 and 20 and 21 at each side of the gate for operating the rocking lever 25, which is pivoted to a bracket or post 26 between the posts 14 and 18. Extending from this lever is a connecting-rod 27, which has a hinge connection at 9$^b$ to an arm 9$^a$, projecting rearwardly from the gate beyond the post 13.

From the operating-arms 16 and 17 and 20 and 21 are straps 27$^a$, connected, respectively, to links 28, which have slots 29, through which extend bolts or pivotal connections 29$^a$ to the rocking lever 25—that is, the levers 16 and 20 are connected to one link and the levers 17 and 21 to the other, so that the gate may be opened or closed from either side. The rocking lever is preferably of an inverted-T shape, consisting of two opposite lower arms 25$^a$ and an upper arm. This lever is pivoted centrally at 25$^c$ to the suitable support 26.

In operation pull on the proper lever will swing the rocker-lever in one or the other direction, and thus open or close the gate, as desired, by pull or thrust on the arm 9$^a$ at the back of the gate. The slot connection at 29 allows the lever to rock without an unnecessary motion of the hand-levers. The four levers are provided, two on a side, to allow the gate to be opened or closed from either side.

In Figs. 5 and 6 I show a modification in which the rocking lever 25 tilts parallel to the gate and has a connecting-rod 30 direct to the gate instead of to a rear arm, as shown in Fig. 1. In this modification I employ double hooks 31 for tilting the rocking lever. The hooks are connected to the oppositely-extending levers 16 and 17 and 20 and 21 and hang in proper position to engage the bolts or pins 29$^b$, projecting from the rocker 25 on opposite sides of its pivot 25$^c$. Either hook may be pulled up by the proper lever on either side of the gate, and movement of the rocker 25 opens or closes the gate.

What I claim as new, and desire to secure by Letters Patent, is—

1. The combination with a swinging gate, of an opener comprising a rocker pivoted at one side of the gate and connected thereto, and two pairs of levers connected to the rocker, each pair having one lever extending on one side of the gate and the other lever extending on the other side.

2. The combination with a swinging gate having a backwardly-extending arm, of a rocker having a hinged connection with said arm, and two pairs of levers, each pair being connected independently to the rocker, and the respective levers of each pair extending on opposite sides of the gate.

3. The combination with a swinging gate having an arm extending rearwardly beyond its pivot, of a rocker pivoted beside the gate and connected to the arm, links having a slot-and-bolt connection with the rocker on opposite sides of its pivot, and a pair of levers connected to each link, the levers of each pair extending oppositely, on different sides of the gate.

In testimony whereof I have signed my name to this specification in the presence of two subscribing witnesses.

EDGAR T. MORRIS.

Witnesses:
SIGNA FELTSKOG,
H. G. BATCHELOR.